April 10, 1934.  C. S. BRAGG ET AL  1,954,520
BRAKE MECHANISM
Filed Sept. 28, 1929  2 Sheets-Sheet 1
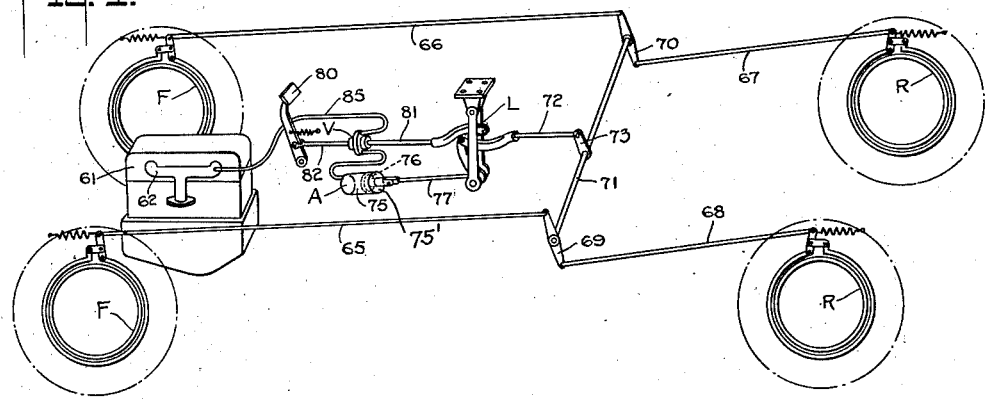
INVENTORS,
CALEB S. BRAGG and
VICTOR W. KLEISRATH
BY
THEIR ATTORNEYS April 10, 1934.   C. S. BRAGG ET AL   1,954,520
BRAKE MECHANISM
Filed Sept. 28, 1929   2 Sheets-Sheet 2
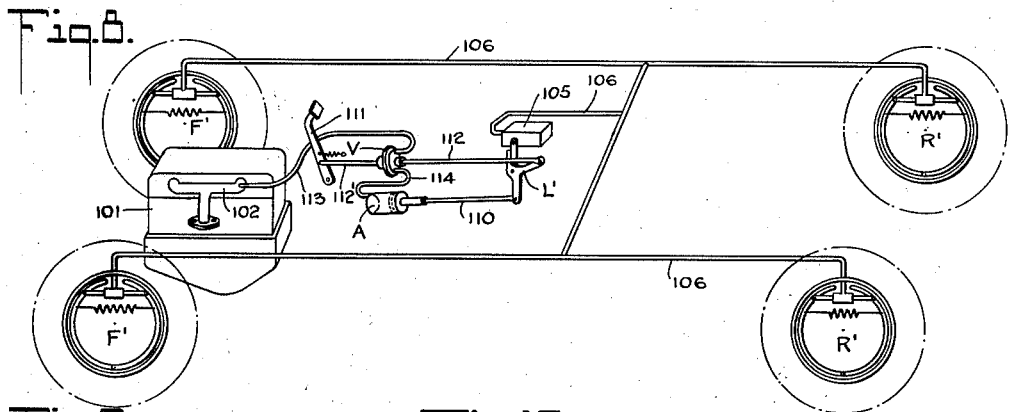
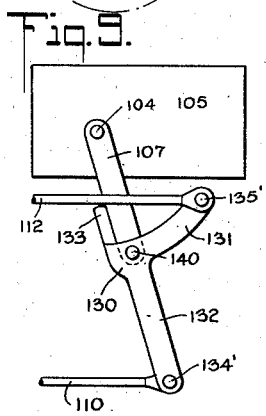
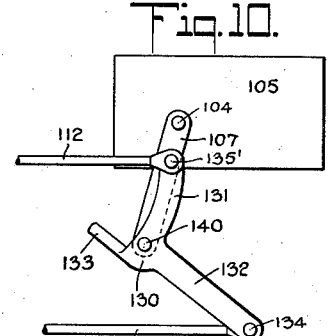
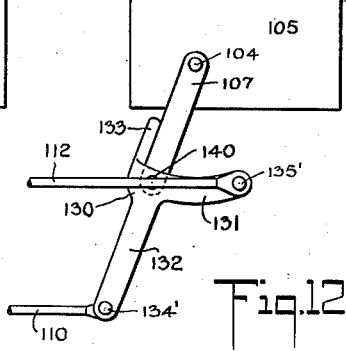
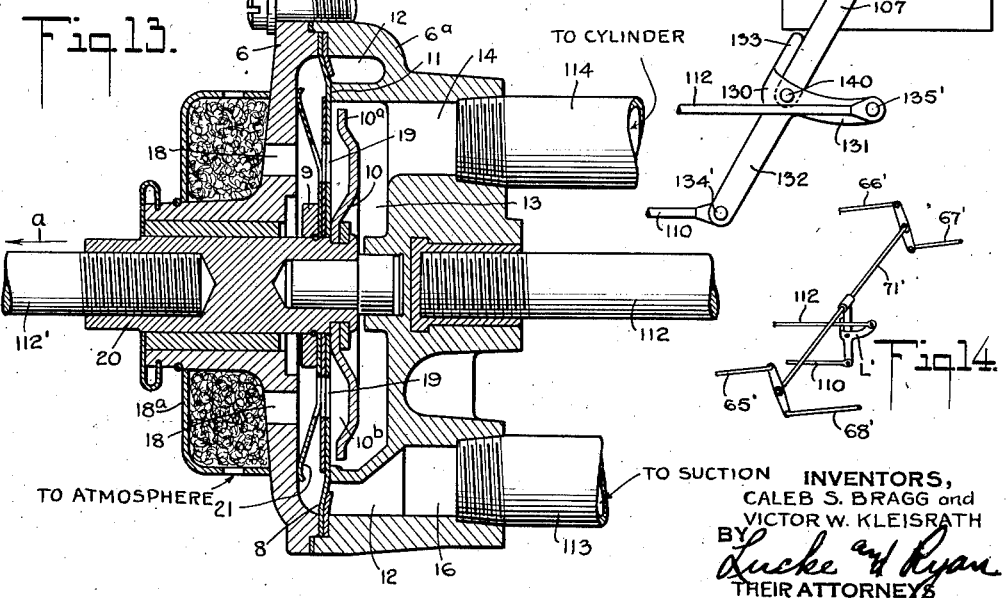
INVENTORS,
CALEB S. BRAGG and
VICTOR W. KLEISRATH
THEIR ATTORNEYS Patented Apr. 10, 1934

1,954,520

UNITED STATES PATENT OFFICE 1,954,520

BRAKE MECHANISM

Caleb S. Bragg, Palm Beach, Fla., and Victor W. Kliesrath, Port Washington, N. Y., assignors to Bragg Kliesrath Corporation, Long Island City, N. Y., a corporation of New York Application September 28, 1929, Serial No. 395,883

6 Claims. (Cl. 188—152)

This invention relates to that type of automotive brake mechanism which incorporates both power and physical means to operate the brakes, and more specifically to the type of brake mechanism in which the brake pedal or lever operates the control mechanism for the power actuator or servo motor, the lever or pedal being directly connected to the brakes. In this type of brake mechanism the power of the power actuator often exceeds the physical strength of the operator, and in order to keep the brake pedal or lever within the range of comfort or convenience of operation, it is necessary to decrease the leverage ratio between the lever and the brakes to a greater degree than if the brakes were to be operated by the physical strength of the operator alone.

The power means is usually known as a power actuator or servo-motor and may be of any type now known to the art inasmuch as this invention does not reside in the design of the power actuator or the control mechanism therefor.

When the operation of a brake mechanism of this type is effected or assisted by means of the power actuator, more force may be exerted upon the brakes than the ordinary operator can or will exert upon the brakes by the physical force alone. Therefore, when the movement of the brake mechanism is effected or assisted by the power actuator, the brakes and levers may move a greater distance than when effected by physical force alone, applied through the brake lever or pedal, and when this distance is multiplied by the leverage ratio ordinarily existing between the pedal or lever and the brakes, we find the throw and travel of the pedal or lever is often appreciably greater when the operation of the brakes is effected or assisted by the power actuator than when the brakes are operated by the physical strength of the operator applied to the pedal or lever. As the throw of the pedal or lever is limited for comfort and convenience of operation, the leverage ratio between the pedal lever and the brakes must also be limited so that the pedal or lever will not reach the end of their movement before the brakes are fully applied under any circumstances, and preferably to provide for reasonable wear of the braking surfaces between adjustments of the brakes. Therefore, the force that the operator is able to exert upon the brakes through the pedal or lever is limited by the movement of the pedal or lever, and it is an object of this invention to provide a leverage device whereby the throw of the pedal or lever when the operation of a brake mechanism is effected or assisted by the power actuator or servo motor is substantially decreased as compared with the throw of the pedal or lever when the brake mechanism is operated by the physical force of the operator alone. In this manner we are able to maintain a higher leverage ratio between the pedal or lever and the brakes for the physical operation thereof, and at the same time decrease the leverage ratio or travel of the pedal when the operation of the brake mechanism is effected or assisted by the servo motor.

The characteristics and advantages of the invention are further sufficiently explained in connection with the following detail description of the accompanying drawings, which illustrate certain representative embodiments. After considering these examples, skilled persons will understand that many variations may be made without departing from the principles involved, and we contemplate the employment of any structures that are properly within the scope of the appended claims.

Fig. 1 is a diagrammatic illustration of an automotive vehicle equipped with mechanical brakes adapted to be operated by power or by physical force or by a combination of power and physical force; and having our invention incorporated therein.

Fig. 2 is a side elevation of pivoted levers adapted to connect the servo-motor, brake pedal and brake linkage and as illustrated is shown in its "at rest" or released position of the brakes;

Fig. 3 is a side elevation of the pivoted levers shown in a position they assume when the brakes are applied by physical force alone;

Fig. 4 is a side elevation of the pivoted levers shown in a position they assume when the brakes are applied by the power actuator;

Fig. 5 is a side elevation of the pivoted levers shown in a position they assume when the brakes are applied by the power actuator and the physical force of the operator is added thereto;

Fig. 6 is a rear view of the pivoted levers as mounted in the automotive vehicles and as seen from the rear of the vehicle;

Fig. 7 illustrates another modification of the pivoted levers;

Fig. 8 is a diagrammatic view of an automotive vehicle having hydraulic brakes adapted to be operated by power or by physical force, or by a combination of power and physical force and having our invention incorporated therein;

Fig. 9 is a side elevation of the master compensator of the hydraulic brake mechanism equipped with pivoted levers shown in the "off" or released position of the brake mechanism;

Fig. 10 is a side elevation of the master compensator with the pivoted levers shown in a position they assume when the brake mechanism is applied by physical force alone;

Fig. 11 is a side elevation of a master compensator equipped with pivoted levers shown in a position they assume when the brake mechanism is applied by the power actuator alone;

Fig. 12 is a side elevation of a master compensator equipped with pivoted levers shown in a position they assume when the brakes are applied by both the force of the power actuator and the physical force of the operator;

Fig. 13 is a sectional side elevation of the control valve for the power actuator; and Fig. 14 is a perspective view of a cross shaft for a mechanical brake system equipped with our invention.

Looking at Fig. 1, 61 illustrates an internal combustion engine of an automotive vehicle equipped with conventional intake manifold 62. F—F illustrates the front wheel brakes for the vehicle and R—R illustrates the rear wheel brakes and are shown as external contracting brakes adapted to be operated by rods 65 and 66 for the front wheel brakes and rods 67 and 68 for the rear wheel brakes, which in turn are attached to levers 69 and 70 mounted on the ends of rock shaft 71, which is adapted to be actuated by link 72 connected to arm 73 of the rock shaft 71.

Link 72 is connected to the pivoted lever device L. Power actuator A which comprises a cylinder 75, and piston 76 is also connected to the pivoted lever device L by a rod 77. Pivoted pedal 80 is connected to the lever device L by rods 81—82 which are adapted to support intermediate thereof control valve V which serves to connect or disconnect actuator A with or from the intake manifolds 62 and atmosphere by means of suitable tubing or piping illustrated at 85.

Pivoted lever device L comprises a main power lever 30 (Fig. 2) made up of parallel arms 31, 32 (Fig. 6), joined together by the pivot 33 at the upper end thereof, which also serves to attach this power lever to a stationary part of the vehicle, such as a cross member of the frame, for instance, pivot 34 at the lower end, and stop 35 intermediate of the ends. The levers may be conveniently carried by a frame member 30' adapted to allow convenient attachment to the vehicle.

Upon the lower end of the power lever 30 is pivoted a secondary or physically operable lever 36 which extends upwardly and is bent rearwardly and in this particular embodiment is adapted to move between the arms 31 and 32, but only to a limited extent because of the stop 35 which limits the rearward movement of ths secondary pivoted lever in relation to the power lever 30. Connected to the upper end of secondary lever 36 are two curved links 37 and 38 adapted to connect the pivoted lever device L with the brake linkage, the former extends rearwardly from the lever 36 and is connected to rod 72 and thus to the brake operating rock shaft 71, the latter link, that is, link 38, extends forwardly and is connected to rod 81 which is adapted to carry control valve V and in turn is connected to the foot pedal 80. The lower end of power lever 30 is pivotally connected to rod 77 which in turn is connected to the piston rod of the power actuator or servo-motor A. In the fully released position of the brake mechanism the piston is in contact with the rear end wall 75' of the cylinder which serves as a stop determining the fully released position of the parts of the brake mechanism, the brake shoes or bands having individual adjustments.

In operation, when the brake mechanism is applied by the physical force of the operator alone acting through foot pedal 80, such as would be the case if the motor where stopped or power actuator A were inoperative due to a broken pipe or other means, the pivoted levers will assume the position shown in Fig. 3, that is, secondary lever 36 will pivot about pin 34 because the piston of the power actuator is in contact with the rear end of the cylinder 15 and rod 17 prevents power lever 30 swinging rearwardly any further than is shown in this figure, so the result is that force imposed upon the pedal 80 will be transmitted to rods 81—82 and pivoted lever 36 and so to rod 72 which is attached to the brake mechanism, and in this manner the brakes may be applied.

On the other hand, if the power actuator is in operative condition and the operator presses down upon pedal 20 the valve V opens and connects the forward end of cylinder 15 with the intake manifold (in a manner which will be described in detail hereafter) so as to cause piston 76 to move forwardly in cylinder 75 because of differential of pressure acting thereon, that is, the lower pressure of the intake manifold on the forward side and the high pressure of the atmosphere on the rear side. This movement is communicated through link 77 to the power lever 30 which will assume the position shown in Fig. 4, that is, the lower end will move forwardly. Stop 35 will engage secondary lever 36 so that both levers, that is, 30 and 36, will pivot as a unit about point 33.

In the construction we have illustrated as embodying our invention, it is possible for the operator to add his physical force to the force exerted by the power actuator and when he does so, the power levers will assume a position shown in Fig. 5, that is, the secondary lever 36 will pivot about point 34 and move away from stop 35 so that any additional effort exerted by the operator will be added to the force exerted by the power actuator.

Looking at Figs. 2 and 3, it will be observed that the rod 81 is farther from pivot 34 than rod 72 so that when the brakes are applied by physical force alone and the levers assume the position shown in Fig. 3, rod 81 must travel further than rod 72 depending upon the relative distance of each rod from the pivot point 34, so that the leverage between brake pedal 20 and the brakes is increased in proportion to the relative distance of these rods from this pivot point.

On the other hand, when the brake mechanism is operated by the power actuator the ends of the rods 81 and 72 will pivot about point 33 and rod 72 will move further than rod 81 because it is further away from the new pivot point, that is point 33, with the result that for the same movement of rod 72 as was produced by the physical operation as described in the last paragraph, rod 81 will now move less than rod 72 depending upon the relative distance of both rods from the new pivot point 33, so we see that when the brakes are applied by physical force alone the ends of rods 72 and 81 pivot about point 34 and rod 81 moves further than rod 72, but when the brakes are applied by the power actuator alone, the rods 72 and 81 pivot about point 33 and rod 72 will move further than rod 81 with the result that for an equal movement of brake rod 72, rod 81 will move less when this movement is produced by the power actuator alone, than when it is produced by the foot pedal alone, so that the "throw" of the pedal 80 is less when the brakes are applied by the power actuator than when the same braking effect is produced by the operator acting upon pedal 80. In our invention we prefer to limit the power of the actuator to the amount necessary to apply the brakes to stop the vehicle with a light or normal load and to require the operator to add his physical strength to compensate for additional loads carried by the vehicles or extreme conditions of the braking surfaces, as when heated, glazed or covered with oil or grease. In the heavier vehicles the power of the actuator is often greater than the physical strength of the operator and it is necessary to limit the leverage ratio to keep the foot pedal from striking the floor board, but our invention permits the operator to add his full physical strength at higher leverage ratios when the brakes have been fully applied by power.

We have illustrated pivoted lever 36 as curved rearwardly and backwardly and co-operating links 37 and 38 are also curved so that when the brakes have been applied to the fullest extent by the power actuator, as illustrated in Fig. 4, the rods 81 and 72 will be substantially in a straight line, so that further force applied to rod 81 through brake pedal 80 to produce maximum braking effect as illustrated in Fig. 5 will not create a couple acting in a direction to produce a force at point 34 to counteract the force exerted by the piston rod of the power actuator.

The embodiment in Figs. 1 to 6, is a preferred embodiment because of the curvature of the lever 36 and links 38 and 37 which do away with a couple acting against the force exerted by the actuator, but we show in Fig. 7 another embodiment of this invention wherein the pivoted lever 136 is not curved but straight and the links 138 and 137 are also straight and they are connected respectively to rods 81 and 72.

The construction and design of the power lever 130 is similar to that of power lever 30, except that it may be necessary to position stop member 135 at a different point along the lever in order that the stop may conveniently engage the secondary lever 136. This embodiment operates in a manner very similar to the mode of operation assigned to the device illustrated in Figs. 1 to 6, except that when the physical force of the operator is added to pedal 80 in addition to the full force of the power actuator, and secondary lever 136 separates from engaging stop 135, a couple is set up due to the forces acting on rods 81 and 72 which tends to move the lower end of pivoted lever 136 to the right, as viewed in Fig. 7, and thus to counteract the pull of the power actuator, but, due to the fact that in such installations the power actuator may exert a much greater force than the physical strength of the operator and also due to the fact that the arm of the couple, that is the distance between the rods 21 and 12 is comparatively small, the force exerted at pivot point 134 tending to counteract the force of the power actuator is so small that it will not prevent the application of substantially all the power of the operator and the power actuator to the brake mechanism.

In Figs. 8 to 12 we have illustrated the application of our invention to hydraulic automotive brake mechanism.

In Fig. 8, 101 illustrates an internal combustion engine for an automotive vehicle and 102 shows the conventional intake manifold thereof, F' F' illustrate the front wheel brakes, and R' R' illustrate the rear wheel brakes which are adapted to be operated in a manner well known to the art and are not described in detail.

The master compensator for the hydraulic system is illustrated at 105 and is connected by suitable piping 106 to the brake mechanism mounted upon the wheels or other moving parts of the vehicle.

At 107 (Fig. 9) is shown the customary operating arm for the master compensator which is adapted to swing back and forth to produce operation of the hydraulic brake mechanism through shaft 104.

A lever L' is pivotally mounted on operating arm 107 keyed to shaft 104 and the piston rod of the power actuator A is pivotally connected to one end 134' of lever 132 by link 110 and pivoted foot pedal 111 is pivotally connected to another arm of pivoted lever L' by link 112 at 135' which also serves to carry and support control valve V, for the actuator A. The actuator is of that type which is known as a vacuum servo-motor and is illustrated as connected to the intake manifold by means of pipes 113, 114, the opening through these pipes being controlled by the control valve V which is adapted to be actuated by movement of pedal 111.

The actuator and valve mechanism per se forms no part of the present invention and will be but briefly described hereafter. The pivoted lever mechanism L' comprises a substantially L-shaped lever 130 comprising substantially right angular arms 131 and 132 the latter being nearly horizontal and the former nearly vertical, when the lever is mounted on arm 107 and a stop arm 133 which forms an extension of arm 132. This lever is pivoted to the lower end of arm 107 at the junction of the three arms 131, 132 and 133. The lower end of arm 132 is connected by rod 110 to the piston rod of the power actuator while the outer end of arm 131 is connected to the foot pedal 111 through rod 112.

Fig. 9 illustrates the position of the levers when the brake mechanism is in its "off" or released position and shows stop arm 133 engaged with arm 107 so that arm 132 forms a continuation of arm 107 in a straight line. Now, if it is desirable or necessary to operate the brake mechanism by physical force alone, movement of rod 112, by means of pedal 111, will cause the pivoted lever 130 and arm 107 to assume the position illustrated in Fig. 10, that is, the lower end of arm 132 to which the piston rod of the actuator is attached will remain stationary because the piston has moved to the right (Fig. 8), as far as it may to permit full release of the brakes, but movement of rod 112 to the left will cause arms 131 and 107 to swing to the left (Fig. 10), (stop arm 133 disengaging from arm 107), which will cause the application of the hydraulic brake mechanism in the usual manner.

When the brake mechanism is applied by the power actuator alone the pivot lever will assume the position illustrated in Fig. 11, that is, pivoted lever 130 and arm 107 will move as a unit because of the fact that stop arm 133 will contact with arm 107 and prevent relative movement between this arm and the pivoted lever 130.

Fig. 12 illustrates the position of the arm and pivoted lever when the physical force of the operator has been added to the maximum force exerted by the power actuator and shows that here again the arm 107 and the pivoted lever 130 move as a unit to produce the desired actuation of the master compensator.

Comparing Figs. 10 and 11 it is quite obvious that when the brake mechanism is operated by the brake pedal 111 alone there is considerably more travel of rod 112 and therefore of the brake pedal than when the brakes are operated to the same extent by the power actuator alone, as illustrated in Fig. 11, so that as in the embodiment of our invention described in conjunction with mechanical brakes the "throw" of the foot pedal is less when the brake mechanism is operated by the power actuator than it is when the same brake effort is produced by the physical force of the operator alone. In other words, the physical strength of the operator is applied through greater leverage when unassisted by the power actuator.

We wish to point out in conjunction with this hydraulic pivoted lever that the arms are so curved and proportioned, that when the power actuator has applied the brakes to substantially its maximum extent any force exerted on rod 112 will pass through pivot point 140, as illustrated in Fig. 11, and further movement of the arm 107 due to the addition of the operators physical force will cause pivot point 140 to move upwardly above rod 112 so that there is no tendency to separate stop arm 133 from arm 107 which would be the case if there were a substantial force acting along rod 112 and acting in a direction and along a line above pivot point 140 instead of below it. This feature corresponds to the advantages explained in conjunction with the curved pivot arm 36 in the embodiment illustrated in Figs. 1 to 6.

In Fig. 14 we have illustrated lever L' applied to the rock shaft 71' of a mechanical brake system where it will function in a manner similar to that described in connection with Figs. 8 to 13 where lever L' is illustrated as operating on the rock shaft of an hydraulic compensator. Rods 65' and 66' are adapted to be connected to the front wheel brake while rods 67' and 68' are adapted to be connected to the rear wheel brakes. Rod 112 will serve to connect lever L' to the control valve V and foot pedal 111 and rod 110 will serve to connect it to the power actuator A.

We wish it to be distinctly understood that we do not limit ourselves to any particular type of power actuator, inasmuch as this invention may be used in combination with any of the actuators now known to the art which are combined and connected up so that the operator may add his physical force to the brakes in addition to any work done by the power actuator.

We have chosen to illustrate this invention in combination with a vacuum type of actuator and shall describe such an actuator with its controlling valve mechanism briefly, in order to facilitate an understanding of the entire combination.

Referring to Figs. 1 and 8, the power actuator A is preferably provided with exterior controlling valve mechanism V which is inserted in linkage between the foot lever 80, and a part connected with the movable part of the actuator, in this instance the lever 36, and the valve mechanism is preferably so constructed as to provide a certain amount of lost motion in said linkage sufficient to operate the valve mechanism and, which, when taken up, will permit the operator to apply his physical force to the brake mechanisms. To facilitate the understanding of the drawings, we have shown in Fig. 13 an enlarged sectional view of a form of valve mechanism which we may employ for this purpose. The specific details of this valve mechanism, however, form no part of the present invention as they are covered by our former application filed November 7, 1927, and given Serial No. 231,724.

The controlling valve mechanism in this instance comprises a hollow casing formed in two parts, 6 and 6a, clamped together upon the edges of a diaphragm 8, dividing the casing into two compartments. The casing member 6a, is provided with an annular diaphragm engaging seat 11, dividing the space within said casing member into a central chamber 13, and an annular suction chamber 12, when the diaphragm is seated firmly upon the seat 11. The casing member 6a, is provided with an aperture 14, communicating with chamber 13, and connected by a flexible pipe 114, with a portion of the actuator cylinder between the piston and the closed end of the cylinder. The casing member 6a, is also provided with an aperture 16, communicating with the suction chamber 12, and connected by means of a flexible pipe 113, with the suction passage of the internal combustion engine between the throttle valve and the engine cylinders, in this instance being connected with the manifold 63, as shown in Fig. 1. Within the chamber 13, of the valve casing is located a disc valve 10, having an annular diaphragm engaging seat 10a, and forming, when seated, a chamber, 10b, within said seat, and between the diaphragm and disc valve. The casing member 6, is provided with one or more air inlet apertures 18 communicating with the atmosphere, preferably through an air strainer, 18a, and the diaphragm 8 is provided with one or more apertures 19, by which atmospheric air may be passed to the space 10b, between the diaphragm and disc valve at all times. The diaphragm and disc valve are connected rigidly and sealingly to a valve actuating part 20, extending through an aperture in the casing member 6, and having a limited amount of movement with respect to the valve casing, in the direction of the arrow a, Fig. 13, determined by a collar or washer 9, on the part 20, adapted to engage the casing member 6, when the part 20 has been moved far enough to bring the seat 10a of the disc valve 10 into engagement with the diaphragm 8, and disengage the diaphragm from its seat 11. In this instance the valve actuating part 20, is connected by a link 112' with the pedal lever 111, and the valve casing is connected by a link 112 with the brake operating arm or lever 131. We have also shown the valve mechanism herein provided with a retracting spring 21 (in this instance in the form of a spider) interposed between the part 20, and the valve casing, for holding the valve mechanism normally in the released position.

Assuming that the power actuator and its controlling valve mechanism have been installed in the manner previously described and that the engine is running with the throttle valve closed, or partly closed, a rarification will be produced in the suction passage of the engine approximately that indicated by twenty inches of mercury, or ten pounds per square inch at sea level, and the air will be exhausted from the suction pipe 26, and the suction chamber 12. In the normal position of the valve mechanism, indicated in Fig. 13, the diaphragm will be seated upon the annular seat 11, thus shutting off the suction from the cylinder and the disc valve 10 will be separate from the diaphragm, establishing communication between the closed end of the cylinder and the piston with the atmosphere, and as the outer faces of the piston 3, are at all times exposed to atmospheric pressure, pressures on the members of the power actuator will be equalized, and they and the brake mechanism will remain in the released positions by reason of their respective retracting springs. To effect an application of the brake mechanisms, the operator will move the foot pedal 80 or other physically operated device connected with the valve mechanism, forwardly, thereby shifting the valve actuating part 20, in the direction of the arrow a, Fig. 13, with respect to the valve casing. This brings the seat 10a of the disc valve into contact with the diaphragm 8, shutting off communication between the cylinder forward of the piston, and the atmosphere, and thereafter moves the diaphragm 8, away from the seat 11, establishing communication between the cylinder forward of the piston, and the suction chamber 12, and the evacuation of the cylinder 1 of the actuator will immediately begin. As rarification takes place within the cylinder 75 the piston will move forwardly with respect to the cylinder, thus moving the lever 30 in a direction to apply the brake mechanism connected therewith. It will be understood that as the brakes are applied by the actuator, the foot lever will be moved forward as long as the operator exerts enough pressure on the pedal to hold the diaphragm valve 8 off of its seat 11, while the operator, by exerting greater pressure on the foot lever than that required to keep the diaphragm valve in open position, can bring the collar 9, into engagement with the valve casing, thus taking up the lost motion provided in the connections between the foot lever 80 and the lever 30, and can exert his physical force on all the brake mechanisms connected with the rock shaft 71 in addition to that being exerted by the actuator. In like manner the operator can apply the brake mechanisms by physical force alone in case of failure of power.

It may also be stated that in the particular form of valve mechanism shown in Fig. 13, a differential of fluid pressure will be built up on the opposite faces of diaphragm 8, and disc valve 10 operating in a direction opposite to that indicated by the arrow a, which will be transmitted to the operator through the pedal lever, so that he must exert a continually increasing pressure on the pedal lever to keep the diaphragm in open position, and is enabled to feel the extent to which the power of the actuator is being applied to the brakes.

It will be understood that in the application of the brakes, if the operator stops the forward movement of his foot, the movement of the actuator (in this instance assisted by the reactionary effect on the diaphragm valve 8) will cause a slight relative movement of the valve casing in the direction of the arrow, Fig. 13, with respect to the diaphragm and disc valve, and the part 20, connected therewith, seating the diaphragm on the seat 11, without however, separating the disc valve therefrom, thus disconnecting the cylinder from the suction passage and holding the brakes as applied. If the operator releases the foot pedal, the valve mechanism will instantly return to normal position and the separation of the disc valve 10, from diaphragm 8, will admit air from the atmosphere to the cylinder of the actuator, equalizing pressures and permitting the brakes and the members of the actuator to return to released position.

It should be noted that when the brakes are operated by the physical force of the operator alone it is not necessary for the operator to move the piston and piston rod and therefore none of the physical force applied to the brake pedal is absorbed in overcoming the friction of the moving parts of the power actuator and it is of no consequence whether the forward end of the cylinder is vented or is not vented, inasmuch as the piston does not move in the cylinder.

We claim:—

1. In combination with a brake mechanism, a power actuator connected to and adapted to actuate said brake mechanism, valve means for controlling the operation of said actuator, physically operable parts connected to and adapted to operate said brake mechanism and control said power actuator, said parts including said valve means and force multiplying means interconnecting said brake mechanism, power actuator, valve means and physically operable parts adapted to cause a smaller movement of certain of said physically operable parts for any given brake application when said brake mechanism is applied by the power actuator than when it is applied by the physically operable part alone.

2. In combination with a brake mechanism, a power actuator connected to and adapted to actuate said brake mechanism, valve means for controlling the operation of said actuator, physically operable parts connected to and adapted to operate said brake mechanism and control said power actuator, said parts including said valve means and force multiplying means adapted to interconnect said power actuator said physically operable parts, valve means and brake mechanism so that upon application of the brake mechanism by the power actuator, the movement of certain of the physically operable parts will be less than when the brakes are applied to the same extent by the physically operable part alone.

3. In combination with a brake mechanism, a power actuator connected to and adapted to actuate said brake mechanism, valve means for controlling the operation of said actuator, physically operable parts connected to and adapted to operate said brake mechanism and control said power actuator, said parts including said valve means and force multiplying means interconnecting said physically operable parts, valve means, power actuator and said brake mechanism adapted to cause a smaller movement of certain of the said physically operable parts for any given brake application when said brake mechanism is applied by the power actuator than when it is applied by the physically operable parts alone and comprising a pair of levers, one pivoted upon the other and a stop to limit the movement therebetween.

4. In brake mechanism for automotive vehicles, physically operable parts connected to said brake mechanism to apply said brake mechanism by physical power, a power actuator operably connected to said brake mechanism, a control valve for said actuator forming a part of said physically operable parts and connected to a movable part of said actuator, so that movement of the former to apply said brake mechanism opens said valve, and the resultant movement of the movable part of the actuator closes said valve, and means adapted to connect said power actuator and said physically operable parts to said brake mechanism so that upon application of the brake mechanism by the power actuator the movement of certain of the physically operable parts will be less than when the brakes are applied to the same extent by the physically operable part alone.

5. In brake mechanism for automotive vehicles, physically operable parts connected to said brake mechanism to enable an operator to apply said brake mechanism by physical power, a power actuator operably connected to said brake mechanism, a control valve for said actuator adapted to be opened by operation of said physically operable parts and comprising one of said parts and closed upon movement of the brake mechanism, and means adapted to connect said power actuator and certain of the said physically operable parts to said brake mechanism so that upon application of the brake mechanism by the power actuator the movement of the aforementioned certain physically operable parts will be less than when the brakes are applied to the same extent by the physically operable part alone.

6. In combination with a brake mechanism, a power actuator connected to and adapted to actuate said brake mechanism, a valve controlling said power actuator, physically operable parts including said valve connected to and also adapted to operate said brake mechanism, and force multiplying means interconnecting said physically operable parts and said brake mechanism adapted to cause a greater movement of certain of the said physically operable parts for any given brake application when said brake mechanism is applied by the physically operable parts alone than when it is applied by the power actuator alone or by the power actuator and physically operable parts acting together.

CALEB S. BRAGG.
VICTOR W. KLIESRATH.